United States Patent [19]

Tow et al.

[11] Patent Number: 5,860,070
[45] Date of Patent: Jan. 12, 1999

[54] METHOD AND APPARATUS OF ENFORCING UNIQUENESS OF A KEY VALUE FOR A ROW IN A DATA TABLE

[75] Inventors: Daniel S. Tow; John T. Kucera, both of Palo Alto, Calif.

[73] Assignee: Oracle Corporation, Redwood Shores, Calif.

[21] Appl. No.: 655,960

[22] Filed: May 31, 1996

[51] Int. Cl.[6] .................................................. G06F 12/14
[52] U.S. Cl. ...................... 707/8; 707/2; 711/216
[58] Field of Search ....................... 395/608, 611, 395/602, 421.06, 421.1; 707/2, 8, 1, 101; 711/216

[56] References Cited

U.S. PATENT DOCUMENTS

| | | | |
|---|---|---|---|
| 4,399,504 | 8/1983 | Obermarck et al. | 364/200 |
| 4,480,304 | 10/1984 | Carr et al. | 364/200 |
| 4,961,139 | 10/1990 | Hong et al. | 364/200 |
| 5,095,423 | 3/1992 | Gramlich et al. | 395/600 |
| 5,339,427 | 8/1994 | Elko et al. | 395/725 |
| 5,414,839 | 5/1995 | Joshi | 395/600 |
| 5,440,732 | 8/1995 | Lomet | 395/600 |
| 5,485,607 | 1/1996 | Lomet et al. | 395/600 |

*Primary Examiner*—Thomas G. Black
*Assistant Examiner*—Jean R. Homere
*Attorney, Agent, or Firm*—Arnold, White & Durkee

[57] ABSTRACT

In a database table with rows each having respective key values, the locking of a key value to enforce key-value uniqueness is accomplished by (a) mapping the key value into a set of hash values to produce a resulting hash value, and (b) locking all key values (i.e., preventing writing of key values in new rows and preventing updates creating new key values in existing rows) that map into the resulting hash value. This provides a compromise between the high-granularity and high-cost solution of indexing, and the low-cost but very low-granularity solution of table-level locking. One useful application of this technique lies in the enforcement of uniqueness of multi-column keys in the table without incurring the cost of indexing all possible combinations of column values that might comprise key values.

17 Claims, 4 Drawing Sheets

| CUSTOMER NUMBER | CUSTOMER NAME | CUSTOMER PHONE NUMBER | SALES REP |
|---|---|---|---|
| 2030002 | O'RIELLY, CHARLES | 214 696 0099 | 1997 |
| 2030003 | BARKER, MARIANNE | 817 267 1177 | 2020 |
| 2030004 | CARI, JANET | 202 893 8822 | 1846 |
| 2030005 | FRAIZER, RODNEY | 512 794 8111 | 1997 |
| 2030006 | WELDON, NANCY | 808 411 9753 | 1997 |
| 2030007 | RHEA, RICK | 512 794 0123 | 1846 |
| 2030008 | LESTER, SHERRY | 717 966 5432 | 2020 |
| 2030009 | HARRY, DEBRA | 608 296 2090 | 1997 |

DATA STORE 105

FIG. 2
(prior art)

METHOD AND APPARATUS OF ENFORCING UNIQUENESS OF A KEY VALUE FOR A ROW IN A DATA TABLE

BACKGROUND OF THE INVENTION

The invention relates to a method of enforcing uniqueness of keys in a data table, without incurring the cost of indexing all existing key values, by utilizing a hashing technique for restricting use of key values.

Databases in Computer Systems

FIG. 1 is a greatly simplified representation of a computer system 100 that includes a data store 105, a database manager 110, and a communications manager 115 used to communicate with a user terminal 120.

The data store 105 commonly takes the form of one or more memory devices (so-called random access memory, i.e., RAM) in combination with, e.g., one or more so-called hard disks, optical disks, magnetic tapes, and flash memory devices, among others.

As discussed in more detail below, the data store 105 is used to store information in the form of data tables.

Physically, the database manager 110 and the communications manager 115 are usually implemented by running suitable computer programs (often referred to colloquially as "software") on a general-purpose programmable central processing unit (not shown).

The software used to implement the database manager 110 may be any of a wide variety of database management system (DBMS) programs. Some well-known examples of DBMS programs currently on the market include Oracle Corporation's ORACLE 7 software, IBM's DB2 software, and Microsoft Corporation's ACCESS software, among others.

The software used to implement the communications manager 115 may be any of a wide variety of operating-system or communications-management programs. Some well-known examples include the MS-DOS operating system, possibly with the Windows user interface; the UNIX operating system software; and IBM's MVS operating system, possibly with the VTAM communications management software, among others.

The computer system 100 is likely to run one or more other computer programs that can perform work for users. Two such programs are illustrated in FIG. 1 as Application Programs 1 and 2. An application program may take the form of, e.g., an airline reservation system, an inventory management system for a chain of auto parts stores, and so forth.

As is well known to those of ordinary skill, many computer systems are capable of executing multiple application programs essentially concurrently on a time-shared basis. In computer systems using multi-processing operating systems, different application programs may be executed in different processes, or multiple instances of the same application program may be executed in different processes.

Application Programs 1 and 2 are designed to exchange requests and information with the database manager 110 so that the database manager can do useful work on behalf of either or both of the programs. The arrows respectively connecting Application Programs 1 and 2 and the database manager 110 illustrate the way in which requests and information might flow.

For example, to be able to process a command from a user at the terminal 120 (received via the communications manager 115), Application Program 1 may need to read information from the data store 105. As shown by the arrows in FIG. 1, Application Program 1 sends a request for the needed information to the database manager 110. The database manager 110 receives the request; reads the requested information from the data store 105; and passes the information back to Application Program 1 (possibly after doing intermediate information processing of its own). Application Program 1 can then respond to the user at terminal 120 via the communications manager 115.

Tables in Databases

Databases very often take the form of tables of information. A table is composed of intersecting rows and columns. Depicted in FIG. 2 is an example of a hypothetical database containing a table 210 with information about a fictional company's sales representatives and customer base. The table 210 is comprised of four columns 214–217. The CUSTOMER NUMBER column 214 contains customer identification numbers; other columns 215, 216, and 217 contain customer names, phone numbers and sales representative identification numbers.

Additional general information concerning database tables can be found in a wide variety of publications, e.g., Rob & Coronel, DATABASE SYSTEMS: DESIGN, IMPLEMENTATION AND MANAGEMENT (Boyd & Fraser 1995); O'Neil, DATABASE: PRINCIPLES, PROGRAMMING, PERFORMANCE (Morgan Kaufmann 1994).

Using Keys to Identify Specific Database Records

Keys are widely (and perhaps almost universally) used in databases to identify specific rows in tables. In database parlance, a key can be one or more columns of each row contained in a table. The values contained in a key uniquely identify each specific row in the table. The term "value" is used to refer to the contents of a row-column, whether numerals, characters, symbols, dates, raw byte strings, etc., or any combination thereof In FIG. 2, the CUSTOMER NUMBER column in table 210 is an example of a key. No two rows in that table are permitted to have the same value in the CUSTOMER NUMBER column, because no two customers should ever have the same customer number.

Multi-Column Keys

In some databases, multiple columns are used as keys. In table 210 of FIG. 2, for example, it might be possible for the CUSTOMER NUMBER value to be the same for two different rows, but for the combination of the CUSTOMER number value and the CUSTOMER NAME value to be unique to each row. This is illustrated more generally by table 410 of FIG. 4, in which a key value in any given row of the table spans more than one column.

Using Indexes to Enforce Multi-Column Key Uniqueness

As noted above, in practically all situations the key of a row in a data table must be unique, i.e., no two rows should ever have the same key value. In implementations in which multi-column keys are used, key uniqueness has typically been enforced by maintaining a data structure apart from the data table, e.g., an index, in which is stored each combination of column values that has been inserted into the corresponding table as of a given point in time. Before a program is permitted to insert a row or update the key to an existing row, the index is checked to ensure that the proposed key value does not conflict with an existing key value.

On some occasions, however, it becomes inefficient or impossible to enforce key uniqueness through indexes. This may occur, for example, when a key contains more columns than can be stored in an index in a particular database management software implementation. For example, in the ORACLE 7 DBMS software, an index cannot be used to enforce uniqueness for more than a 16-column key.

In these instances, one approach to enforcing key uniqueness is to lock the entire data table 210 (i.e. table-level locking) and to check for column-combination uniqueness prior to allowing any row insertion or key-value update attempts. That has the effect of ensuring key uniqueness for inserted rows and for rows whose keys are updated.

Unfortunately, table-level locking prevents insertions and key-value updates from happening simultaneously with any other insertion, deletion, or updates on the same table from other processes on the same database. That can be very likely to create a bottleneck on performance for active tables.

SUMMARY OF THE INVENTION

A method in accordance with the invention helps enforce key uniqueness while compromising between the high-granularity and high-cost solution of column indexing and the low-cost but very low-granularity solution of table-level locking. This is achieved by:

(a) mapping the set of potential key values that might be found in the different rows of a table, whether single-column or multi-column, into a set of hash values, so that each potential key value is associated with a hash value; and (b) providing a locking mechanism for key-value changes in the table, e.g., insertions of new rows or updates to the key values of existing rows, that is tied to the respective hash values, so that (c) when a process needs to make a key-value change in a table (e.g., adding a new row with a particular key value or changing the key value of an existing row), the particular hash value associated with the proposed key value to be added or updated is locked. As a result, other processes are precluded from making changes that would create new key values associated with that hash value.

Thus, locking a key value is accomplished by obtaining a lock for a particular hash value. That has the effect of locking the key value in question, and also some (but not all) other potential key values (i.e., key values that map to the same hash value), regardless of the number of columns used for a key.

As long as the number of hash-value-level locks is much greater than the number of simultaneous inserts or key-value updates, the probability of lock contention at any given time is advantageously low. This means that a process attempting to add a new row or to update a key value in an existing row is likely to be able to do so without being blocked from doing so by a lock obtained by another process.

BRIEF DESCRIPTION OF THE DRAWINGS

FIG. 2 is a block diagram view illustrating a table in a database as might be used in an illustrative method in accordance with the present invention.

DETAILED DESCRIPTION OF ILLUSTRATIVE EMBODIMENTS

An illustrative embodiment of a method in accordance with the invention is described below. In the interest of clarity, not all features of an actual implementation are described in this specification. It will of course be appreciated that in the development of any such actual implementation (as in any computer-system development project), numerous engineering and programming decisions must be made to achieve the developers' specific goals and subgoals (e.g., compliance with system- and business-related constraints), which will vary from one implementation to another. Moreover, attention will necessarily be paid to proper programming practices for the environment in question. It will be appreciated that such a development effort might be complex and time-consuming, but would nevertheless be a routine undertaking of system development for those of ordinary skill having the benefit of this disclosure.

Illustrative Method of Enforcing Key-Value Uniqueness

A method in accordance with the invention is performed by a computer system executing a process running a database management program. The term "database management program" is used to encompass not only large dedicated systems but utility programs that perform the same functions described above. For example, the method could alternatively be performed by a client program that makes a call to a database server program.

Figure 1:
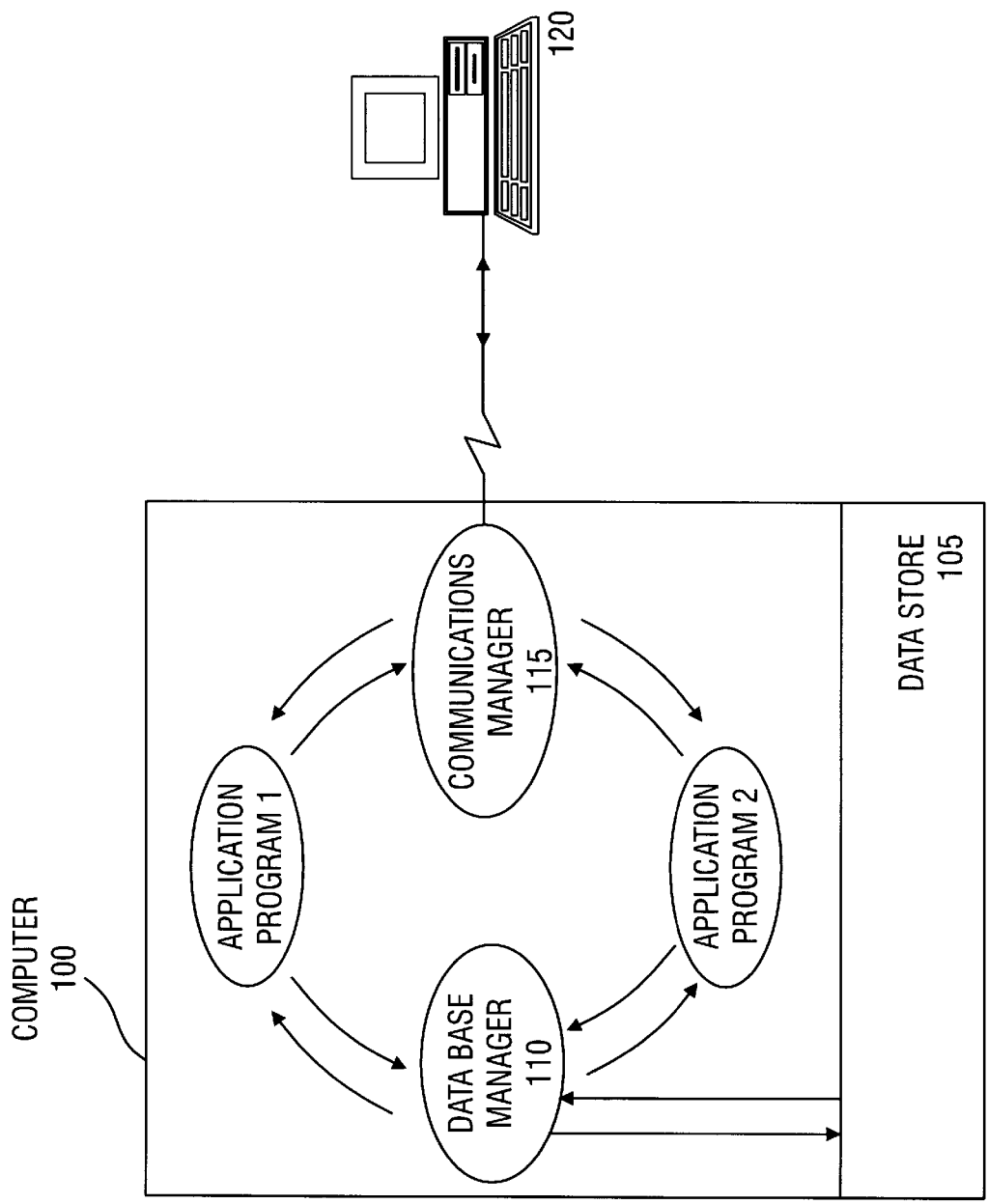
FIG. 1 is a simplified diagram of a computer system running a database program of the kind with which a method of the invention may be used.
Figure 3:
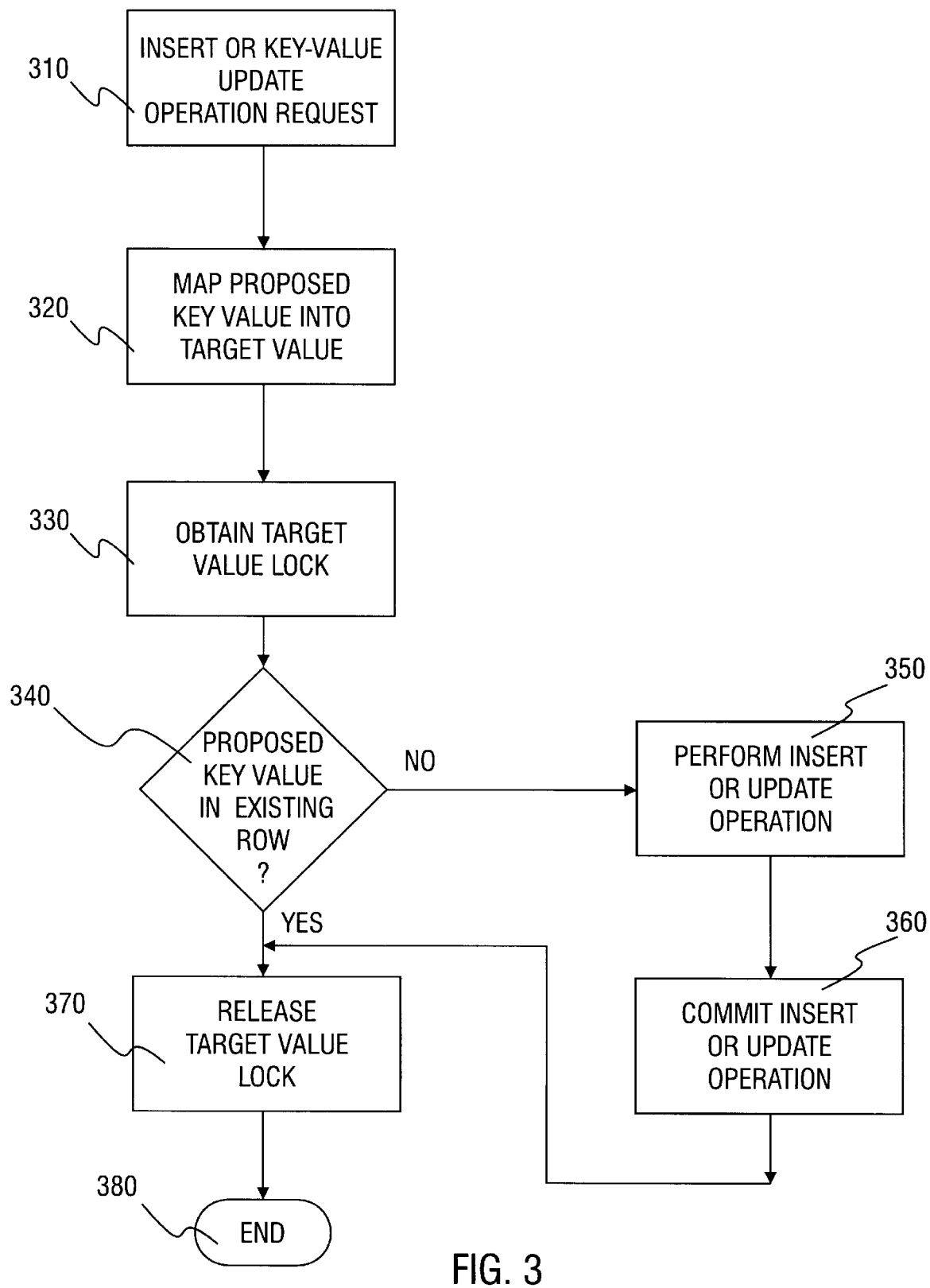
FIG. 3 is a flow chart of specific steps performed in accordance with such a method.

Referring to FIG. 3, the method is performed in connection with the performance of an operation on a table of a database. As shown at block 310, the operation may be either inserting a row, which necessitates including a unique key value as a key for the row; or updating the key value of a row, which necessitates ensuring that the updated key value is unique, i.e., that the updated key value is not the same as the key value of another row.

The row to be inserted or to have its key value updated has a proposed key value defined by at least a portion of the information contents of the row. For a row-insertion operation, the term "proposed key value" is used to refer to the key value to be inserted; for a key-value update operation, the term is used to refer to the key value that will result after completion of the update.

The proposed key value may comprise all or part of the information contents of one or more particular columns in a multi-column row. If the key is defined by a single column, then the proposed key value for a particular row is the information content of that column in the row. On the other hand, if the key spans multiple columns, then the proposed key value is the concatenation of the information contents of those columns. In some database implementations, the information contents in question may be managed as a single column; the method still advantageously permits enforcement of uniqueness on particular subsets of the column.

At block 320, the proposed key value is mapped into a target value (in a set of target values). The set of target values may be a set of hash values. Hashing and hash values are well-known concepts in the art. One pseudo-random approach to mapping the key value into a set of hash values, for example, may comprise the sum (or the concatenation) of the numeric values of the bytes comprising the key value, modulo a prime number. The specific hash function does not matter as much as that the hash function is consistent, i.e., the same key value in a given table will always map into the same target (hash) value.

Source code for an illustrative hash function is reproduced below. It will be appreciated that different hash functions may be used for different tables or even for different keys within the same table.

Figure 4:
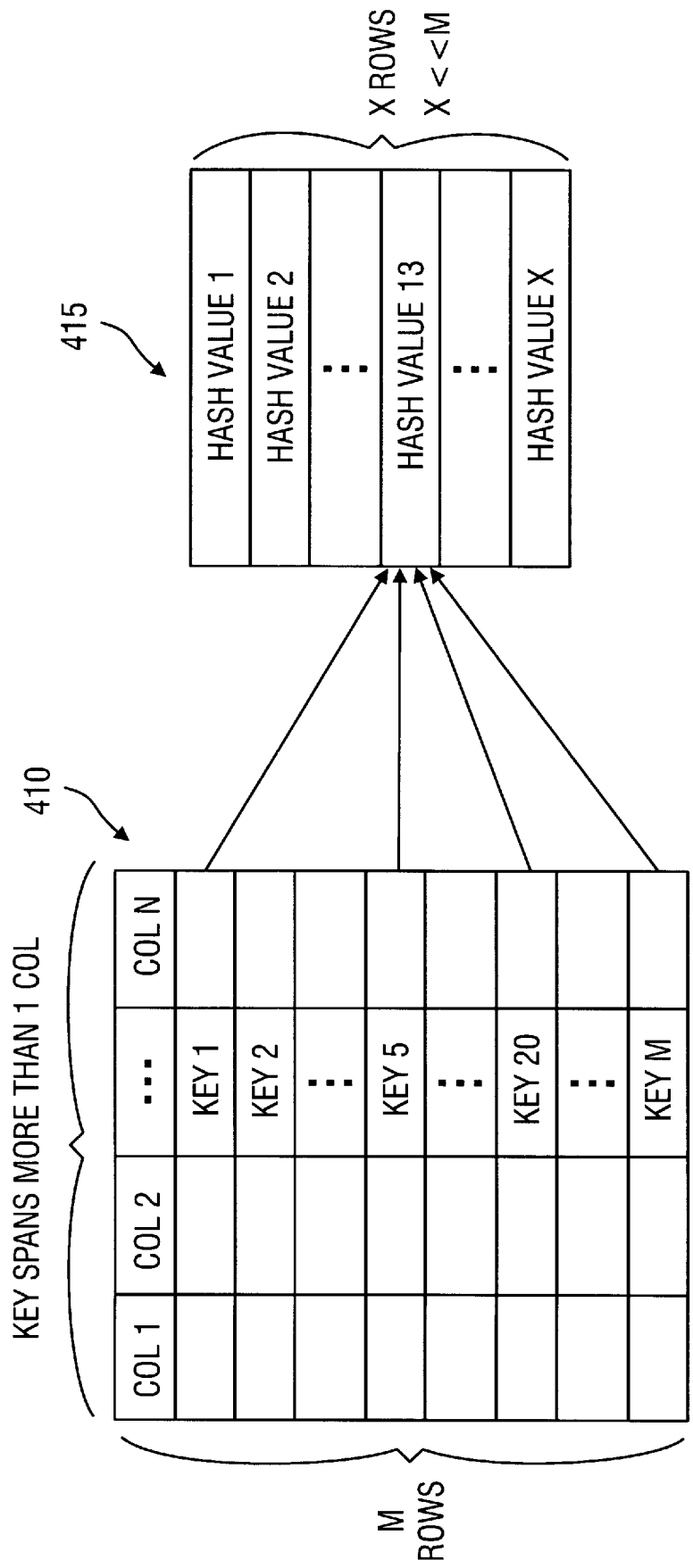
FIG. 4 illustrates schematically the hash-level-locking concept underlying the method described below.

The effect of the hashing is illustrated in FIG. 4. Table 410 has M rows and N columns. A key of this table spans all N columns. The respective key values of the M rows of the table 410 are mapped into a table 415 of hash values. The number of rows of the table 415 is much less than the M rows of table 410.

At block 330, use of the target value by other programs is precluded. This is referred to as obtaining a target-value lock. If the target value is a hash value stored in a table containing all possible hash values with one hash value per row, and row locking is supported by the database management system software, then is this may be done by obtaining a lock on the row of the table storing the target (hash) value. As illustrated in FIG. 4, locking the row of the table 415 storing the target value (hash value 13, for example) has the effect of locking multiple potential keys of the underlying data table 410.

Alternatively, a nontable target-value lock structure may be defined in storage accessible to other processes on the computer system.

At block 340, a test is made to determine whether the proposed key value is present in an existing row of the table 210. The test for presence of the proposed key value in the table 210 may take the form of a query on the table. Like any query, this query may benefit from the use of an index on some portion of the key. Because the index is only of a portion of the key, it may need to be non-unique, but that may be more practical than a unique index on the entire key. (Of course, if a unique index on the entire key were practical, it would follow that use of the method being described here would be unnecessary.)

At block 350, if the proposed key value is not present in the table 210, then the row-insertion or row-update operation is performed, and then is committed at block 360. The target-value lock is then released at block 370. On the other hand, if the proposed key value is indeed present in the table 210, then the row-insertion or row-update operation is terminated and the target-value lock is released at block 370. Optionally, an error message indicating violation of a uniqueness condition may be displayed on the terminal 120, printed on a printer (not shown), or logged to an error file.

The row insertion may be part of a more complex "transaction," a term used in the art to refer generally to a unit of work that proceeds from one consistent state of data to another. For example, it is possible, and likely in practice, that the "commit" stage of the operation, illustrated in block 360 of FIG. 3, could be deferred until after the same computer program or process repeats the operations illustrated at blocks 310 through 340 a number of times. Accordingly, the commit of the row insertion may take place immediately, or in some situations may take is place after a delay, e.g., a delay to permit other work required before completion of the transaction.

A database deadlock may arise if multiple users insert more than one row before either of them commits. Such a deadlock would require one of the users to release all locks and undo all changes made and try again later.

It will be apparent to those of ordinary skill having the benefit of this disclosure that in some atomic-type implementations, committing the row insertion and releasing the lock corresponding to the hash value are automatically done together with a single command. For example, in systems implementing the well-known SQL RDBMS language, in which the target-value lock would take the form of a lock on a row of a table containing a set of hash values, a COMMIT command automatically results in both operations being performed simultaneously.

Such persons of ordinary skill will also recognize that the illustrative method can also be implemented with the set of target values and target-value locks being shared between multiple tables. If desired, economy of operation can be achieved by using the same set of target values for multiple tables in the database. If this is done, theoretically, a process attempting to insert a row in one table ("Table A") might be precluded from doing so because another process is inserting a row with the same proposed key value (or another proposed key value that maps into the same target value) into another table ("Table B"), and thus has the target-value lock. The worst that happens in that event is that the insertion of a row into Table A will be delayed until the Table B process releases the target-value lock.

It is anticipated that the method will be used on each of a set of tables to maintain the uniqueness of a set of keys on those tables, but it may of course be used once to maintain uniqueness of a single key.

Illustrative Hashing Algorithm

The following is an illustrative implementation of a hashing algorithm in Oracle Corporation's PL/SQL programming language:

```
/* ---------------------------------------------------------------- */
/* Sums ASCII values of all characters mod NHASH. ASCII returns code */
/* up to 64K for multi-byte characters. Multiply code for each char  */
/* by the characters position to make non-commutative                */
/* ---------------------------------------------------------------- */
NHASH CONSTANT NUMBER := 997;
TYPE ValueIDArray IS TABLE OF VARCHAR2(2000) INDEX BY BINARY_INTEGER;
FUNCTION hash_segs (n IN NUMBER, segs IN ValueIDArray)
            RETURN NUMBER IS
    hval NUMBER;
    cval NUMBER;
    seglen         NUMBER;
    chr_count      NUMBER;
BEGIN
    hval := 0;
```

```
        chr_count := 1;
        for segnum in 1..n loop
            if (segs(segnum) is not null) then
                seglen := LENGTH(segs(segnum));
                for I in 1..seglen loop
                    cval := ASCII(SUBSTR(segs(segnum), I, 1));
                    hval := hval + cval*chr_count;
                    chr_count := chr_count + 1;
                end loop;
            end if;
        end loop;
        return(MOD(hval, NHASH));
        EXCEPTION
            WHEN OTHERS then
                return (-1);
END hash_segs;
```

Persons skilled in the art will recognize that the resulting hash values are more likely to be distributed pseudo-randomly if the NHASH value is a prime number. By choosing the NHASH value from prime numbers, it is less probable that a naturally-generated set of keys will map unevenly to the available hash values. Persons skilled in the art will also recognize in the foregoing illustrative implementation that the hash function is made non-commutative by multiplying the ASCII code for each character by the character position. This further ensures that the mapped values will distribute as desired.

Remarks

A major advantage of the method described above is that it helps enforce uniqueness of row key values during concurrent table operations by locking only a small subset of the keys in the table instead of the entire table.

For example, use of a three-digit target value table (e.g., a hash table) provides 1,000 possible target values into which key values can be mapped. That means that a process attempting to insert a row into the table can do so by locking only 1/1000 of the possible key values.

In other words, at negligible cost, use of the method dramatically increases the number of processes that can concurrently add rows to a table without harmful processing delays.

If the number of hash-value-level locks is well below the number of rows in the table being managed, the storage costs of hash-value-level locks will be much lower than the storage costs of enforcing uniqueness through indexes.

Even if the number of hash-value-level locks is comparable or greater than the number of rows in the table, then the storage costs of hash-value-level locks may still be much lower than the storage costs of associating uniqueness through an indexing arrangement. This is because the amount of storage required per hash-value-level times the number of hash levels may still be much less than the amount of storage required to maintain a multi-column key index for the same number of rows.

Program Storage Device

It will be apparent to those of ordinary skill having the benefit of this disclosure that any of the foregoing variations may be implemented by programming a suitable general-purpose computer having appropriate hardware. The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

It will be appreciated by those of ordinary skill having the benefit of this disclosure that the illustrative embodiments described above are capable of numerous variations without departing from the scope and spirit of the invention. Accordingly, the exclusive rights sought to be patented are as described in the claims below.

What is claimed is:

1. A method, performed by a process in a computer system, of writing, to a row in a table of a database in a data store and in response to a request from a computer program, a unique key value for said row, said row having proposed information contents and further having a proposed key value defined by at least a portion of the proposed information content of the row, said method comprising:

(a) mapping the proposed key value into a target value in a set of target values;

(b) precluding other processes from writing key values that map into said target value by locking said target value;

(c) testing whether the proposed key value is present in an existing row of the table, and (1) if not, then writing the unique key value, committing the write operation, and releasing the target-value lock, (2) else releasing the target-value lock.

2. The method of claim 1, wherein the row has one or more columns and the key value is defined by at least a portion of the proposed information contents of the one or more columns.

3. The method of claim 1, wherein the set of target values is a set of hash values.

4. The method of claim 1, wherein said set of target values is used for multiple tables.

5. The method of claim 1, further comprising, prior to obtaining the target-value lock, testing whether another process has obtained the target-value lock and if so, then deferring obtaining the target-value lock until the other computer program has released the target-value lock.

6. The method of claim 1, wherein a plurality of key values may be mapped into the same target value.

7. A method, performed by a computer system executing a process running a database management program, of performing an operation on a row of a table of a database in a data store, said operation being sleeted from the group of operations consisting of inserting the row and updating a key value for the row, said row having proposed information contents contained in one or more columns of said row and further having a proposed key value defined by at least a portion of the proposed information content of the row, to ensure uniqueness of the proposed key value, comprising:

(a) mapping the key value into a target value in a set of hash values;

(b) precluding another process from adding a row or updating a key value for a row in which the key value for the row also maps into said target value by locking said target value;

(c) testing whether the proposed key value is present in an existing row of the table, and (i) if not, then performing the operation, committing the operations, and releasing the target-value lock, (ii) else releasing the target-value lock.

8. The method of claim 7, wherein said set of target values is used for multiple tables.

9. The method of claim 7, further comprising, prior to obtaining the target-value lock, testing whether another process has obtained the target-value lock and if so, then deferring obtaining the target-value lock until the other process has released the target-value lock.

10. The method of claim 7, wherein a plurality of key values may be mapped into the same target value.

11. A method, performed by a computer system executing a process running a database management program, of performing an operation on a row in a table of a database in a data store, said operation being selected from the group of operations consisting of (i) inserting the row and (ii) updating a key value for the row, said row having proposed information contents and further having a proposed key value defined by at least a portion of the information contents of the row, to ensure uniqueness of the proposed key value, comprising:

(a) mapping the proposed key value into a target value in a set of target values;

(b) testing whether another process has precluded use of the target value by another process by locking said target value and if so, then repeating this step, else obtaining a target-value lock; and (c) testing whether the proposed key value is present in an existing row of the table, and if not, then performing the operation, committing the operation, and releasing the target-value lock, else releasing the target-value lock.

12. The method of claim 11, wherein the row has one or more columns and the proposed key value is defined by at least a portion of the proposed information contents of the one or more columns.

13. The method of claim 11, wherein said set of unique target values is a set of hash values.

14. The method of claim 11, wherein the set of target values is used for multiple tables.

15. The method of claim 11, wherein a plurality of key values may be mapped into the same target value.

16. A program storage device readable by the computer system of a specified one of claims 1 through 15 and encoding a program of instructions executable by the computer system for performing operations including the operations recited in said specified one claim.

17. A computer system that includes (1) a data store containing a table, (2) a programmable processor, and (3) a program storage device readable by the processor and encoding a program of instructions for performing operations including the operations recited in said specified one of claims 1 through 16.

* * * * *